April 25, 1939.  J. H. JEFFREE  2,155,661

LIGHT MODULATING DEVICE

Original Filed Feb. 27, 1935   2 Sheets-Sheet 1

Inventor:
J. H. JEFFREE

April 25, 1939. J. H. JEFFREE 2,155,661
LIGHT MODULATING DEVICE
Original Filed Feb. 27, 1935 2 Sheets-Sheet 2

Inventor:
J. H. JEFFREE

Patented Apr. 25, 1939

2,155,661

UNITED STATES PATENT OFFICE 2,155,661

LIGHT MODULATING DEVICE

John Henry Jeffree, Oxshott, England, assignor to Scophony Limited, London, England, a company of Great Britain Original application February 27, 1935, Serial No. 8,451. Divided and this application March 2, 1937, Serial No. 128,622. In Great Britain March 3, 1934

4 Claims. (Cl. 179—100.3)

This application is a division of application Ser. No. 8,451, filed Feb. 27, 1935.

This invention relates to systems for producing and utilising a modulated light beam, for producing upon a moving recording surface a record of variations, such for example as oscillations corresponding to sounds.

The present invention utilises the known principle that when high frequency mechanical waves are caused to traverse a body forming part of an optical system, they bring about in general retardations and accelerations of the wave front of a beam of light passing through or reflected from the body, these retardations and accelerations corresponding to the regions of compression and rarefaction or of varying displacement of the body produced by the waves. Owing to the regular spacing of these regions, corresponding to the wavelength employed, there can be produced optical effects similar to those caused by a diffraction grating.

This may be explained as follows:

It is well known in optics that if light is thrown on to a diffraction grating consisting of a reflecting or transparent body on which there are formed a number of closely spaced ridges, or on which there are ruled a number of lines, some light is thrown or diffracted out of the path which the beam would take were there no ridges or lines, the angle of the diffracted beam to the main beam which maintains its normal direction being determined by the wavelength of the light and closeness of the ridges or rulings.

If mechanical waves are caused to traverse a body, and light is thrown thereon, the waves are also capable of acting in the same way as the lines or ridges of a diffraction grating, to produce diffraction effects.

The present invention is based upon the following. Because some of the light is thrown out of the main beam by diffraction effects, the amount of light remaining in the main beam is reduced by an amount corresponding to the amount of light diffracted. If the amplitude of the mechanical waves is sufficiently large, all the light may suffer diffraction, and the main beam becomes extinguished.

In a known arrangement for using this principle for the purposes of light modulation a parallel beam of light is passed through a cell having two opposite transparent walls and filled with a transparent liquid. At the bottom of the cell is attached a piezo-electric crystal. High frequency electrical oscillations, modulated by the oscillations with which it is required to control the light beam are applied across opposite surfaces of the crystal, which vibrates in sympathy with these oscillations and sets up corresponding mechanical oscillations in the liquid in the cell. The light beam passing through the liquid becomes divided into a diffracted portion and a central beam maintaining its normal direction. The amount of light in the central beam will vary inversely in accordance with the amplitude of the mechanical waves in the liquid. An apertured screen is provided in the path of the light, and is arranged to allow the central beam to pass to a utilisation surface, and to arrest the diffracted light.

In a system of this kind, it is necessary that the width of the beam shall be less than the wavelength in the liquid of the cell of the highest modulation frequency. When the width of the beam is equal to the wavelength, or to any integral multiple thereof, there is no modulation. If high modulation frequencies are used (as is the case in television systems) it may be necessary to use a beam width which is only a fraction of a millimetre wide, thus severely restricting the amount of light available.

It is an object of the present invention to provide an improved system of the above kind in which the amount of light available in the modulated light beam is substantially increased.

Other objects of the invention will appear from the following description and the appended claims.

The invention will be described by way of example with reference to the accompanying drawings, in which Fig. 1 represents in sectional elevation one form of light modulator to which the invention is applicable, Figs. 2 and 3, show diagrammatically an optical system using the apparatus illustrated in Fig. 1, Fig. 2 being a side view and Fig. 3 being a view in plan of the system, Fig. 4 shows in side view the application of the invention.

Figures 1, 6:
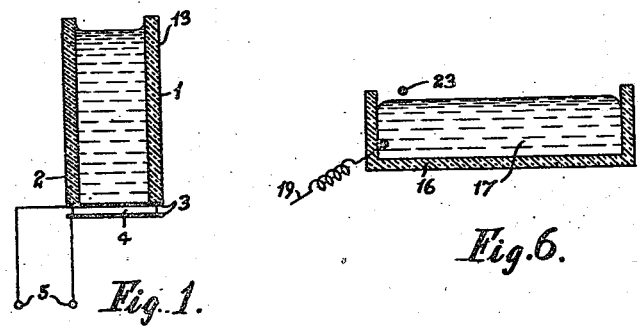
Figs. 5 to 8 show in sideview modifications of part or parts of the apparatus shown in Figs. 2 and 3.

Referring now to the drawings, Fig. 1 shows a cell of known kind, in which modulated mechanical waves may be produced for the purpose of light modulation. A vessel 13 has walls 1 of glass or similar transparent material, and a base of metallic layers 3 between which is held by suitable means a piezo-electric crystal 4. Thus the crystal may be a thin quartz plate cut perpendicular to its electric axis, having each face coated with aluminum foil, or gilded. The vessel 13 contains a transparent liquid 2 such as water or paraffin oil. If high frequency electric oscillations are applied across the terminals 5 which are connected to the metallic plates 3, the piezo-electric crystal 4 will vibrate mechanically in sympathy with the applied electrical oscillations. These vibrations will pass into the liquid 2, and a series of compressional waves, of intensity corresponding to the magnitude of the electric oscillations on the plates 3, will move up the vessel at a speed depending on the nature of the liquid contained therein. If the mechanical waves are modulated in amplitude by modulating the high frequency potential applied across the terminals 5, the intensity of the compressions and rarefactions will be correspondingly changed. If now a light beam is passed through the cell in a direction substantially parallel to the major surfaces of the crystal 4, that is substantially at right angles to the direction of propagation of the waves in the liquid 2, and if either the central or outer portions of the emergent beam are selected, the resulting beam will change in intensity in accordance with the applied modulations.

Figure 2:
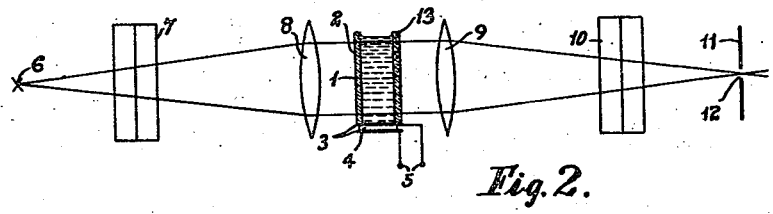
Figure 3:
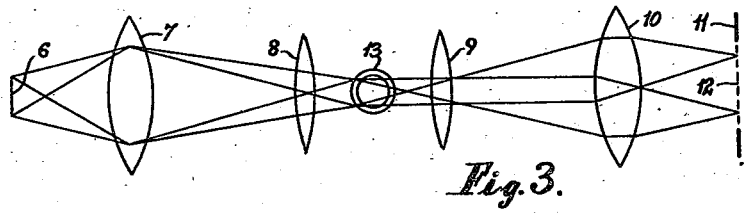

Figs. 2 and 3 show diagrammatically an optical system for use with the cell 13 shown in Fig. 1. Light from a source 6, preferably longer in the plane of Fig. 3 than in that of Fig. 2 passes through the cylindrical lens 7 and the spherical lens 8 and thence through the cell 13; the spherical lens 9 and the cylindrical lens 10 in conjunction with the cell 13 itself (acting as a cylindrical lens) serve to form an image of the source 6 on the aperture 12 of the diaphragm 11. The cell 13 may be of other than circular cross-sectional area. In cases where it has a rectangular cross-section for example, it will clearly have no focussing effect on the beam. The aperture 12 may be elongated in the same direction as the light source 6.

The beam of light passing through the aperture 12 is modulated in accordance with the modulations of the mechanical waves propagating through the cell 13, the diffraction spectra produced by the waves in the liquid 2 being arrested by the diaphragm 11.

The lenses 7 and 10 may be omitted if desired. It is, however, not usually practicable to construct a cell of large dimensions, the chief restriction being in the direction of its cross-sectional area as indicated in Fig. 3. It is in order that this restriction should not materially lessen the amount of light available, that the cylindrical lenses 7 and 10 of Figs. 2 and 3 are used in this example. They serve to produce an increased condensation of the light in the plane of Fig. 3. In the plane of Fig. 2 it is however advantageous to have the cell long (for reasons which will be brought forward later) and extra condensing power in this plane, beyond that given by the spherical lenses 8 and 9, is not usually required.

The present invention utilises the fact that the mechanical waves which cause diffraction effects travel with a finite velocity along the body in which they act. If therefore this body be long enough in the direction of travel and if the waves be modulated in intensity sufficiently quickly, there may be present, at any moment, regions of different intensity of modulation in different parts of the body, these regions themselves moving at about the speed of propagation of the waves. If, as in one feature of the present invention, it be desired to apply simultaneously to a given spot all the light controlled by the device, this fact may limit the permissible length of wave-bearing body that can usefully be employed since, as already stated, it is then necessary that the width of the light beam, in the direction of travel of the waves, should be less than the wavelength in the body, of the highest modulation frequency. In cases, however, where the effective position of application of the controlled light is required to change with time, as for example in recording sound or other variations of a moving film, this above mentioned fact permits of advantageous application as will be described with reference to Fig. 4.

Figure 4:
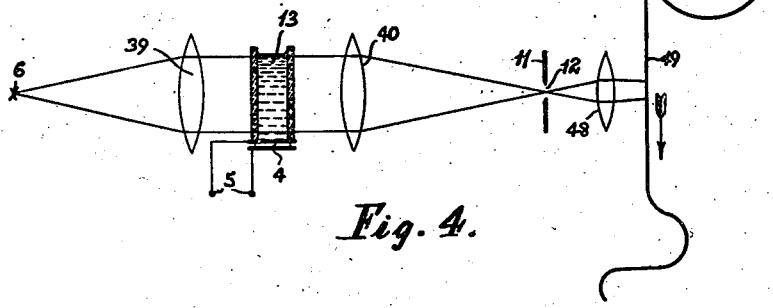

Fig. 4 shows an example of the present invention in its application to the recording of oscillations, such as sound, in which the form of modulating device shown in Fig. 1 is used. Here 6 is a light source, light from which, rendered parallel by a lens 39, passes through a modulating device 13 in which mechanical waves are propagated upwards, and is focussed by a lens 40 upon a slit 12 of a diaphragm 11 which selects the controlled portion of the light to be used. Thereafter the light passes through a lens 48, which focuses upon a moving film 49 an image of the device 13 of such size that the imaged velocity of the wave groups moving upwards in the device 13 is equal to the downward velocity of the film 49. Thereby the wave group images maintain a constant location on the film during their passage along the image of the cell as a whole, and definition of modulation impulses is secured independent of the size of the illuminated area. This apparatus may for example be applied to the recording of sound upon a film, high frequency oscillations modulated in accordance with the sound being applied to terminals 5.

The apparatus of Fig. 4 can clearly be used where the wavelength in the cell 13 of the highest modulation frequency applied thereto is such that a plurality of cycles of this frequency are operative upon the light beam at the same time because of the immobilisation of the wave images relatively to the recording surface 49. A substantial increase in optical efficiency compared with known devices of this kind can thus be obtained.

However, the invention is not limited to such cases but can be used with advantage, even where the width of the beam, in the direction of travel of the waves (upwards in Fig. 4), is less than the wavelength of the highest modulation frequency.

An important feature of both these aspects of the invention is the focusing of an image of the cell 13, or of the waves therein, upon the recording surface 49. It is also desirable that an image of the light source 6 should, as shown in Fig. 4, be focused in the neighbourhood of the diaphragm 11 which serves to separate the diffracted part of the light from the cell 13 from the undiffracted part thereof.

Figures 5, 7:
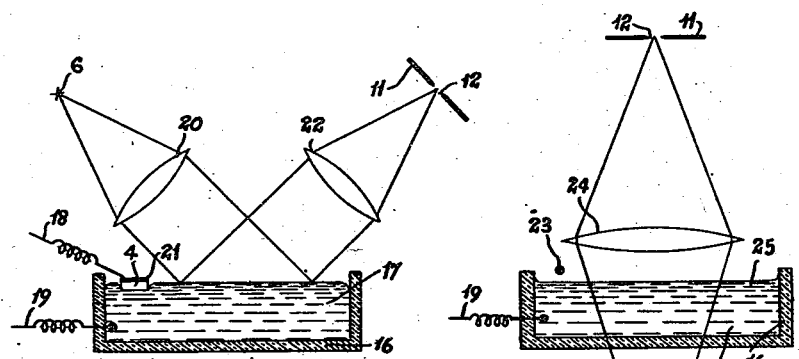

In Figs. 5 to 8 are shown optical systems using novel forms of light modulator which may be used instead of that shown in Fig. 1. In the arrangement of Fig. 5, a suitable quantity of mercury 17 in a vessel 16 has waves produced on its surface by oscillation of the piezo-electric crystal 4 which floats on the mercury, and across which high frequency oscillations are impressed by the lead 18 connected to a metallic coating 21, and a lead 19, which is in contact with the mercury 17, through the wall of the vessel 16. The mercury acts as the other metallic facing of the crystal. Light from the source 6 is rendered parallel by the lens 20 and reflected from the surface of the mercury through the lens 22 which focuses an image of the source 6 on to the aperture 12 of the diaphragm 11. The waves on the surface of the mercury act in a similar manner to a normal reflecting diffraction grating, and produce scattering of the reflected beam, the amount of scattering being dependent upon the amplitude of the waves. The diffracted light is arrested by the diaphragm 11 and the modulated beam passes through the aperture 12 therein.

In Fig. 6 is shown an alternative method of producing waves on the surface of a liquid, by the electrostatic attraction between the liquid 17 and a wire 23 running parallel to the surface of the liquid 17, and fixed a short distance above the surface. The high frequency oscillations are applied to the wires 19 and 23, and owing to alternating electrostatic attraction between the liquid 17 and the wire 23, waves are formed on the surface of the liquid 17. The optical arrangements used with this form of modulating device may be similar to those shown in Fig. 5.

In Fig. 7 is shown a modification of Fig. 6, where a transparent liquid 17 is used, the base of the vessel 16 also being of transparent material. Light, instead of being reflected from the surface of the liquid, is passed through it. High frequency alternating potentials are applied across the wires 19 and 23, as in the case illustrated in Fig. 6, whereby waves are produced on the surface 25 of the liquid 17. Light from the source 6 passes up through the liquid, and the diffraction effects take place at the upper surface 25 of the liquid 17. The light is focused by the lens 24 on to the aperture 12 of the diaphragm 11.

Figure 8:
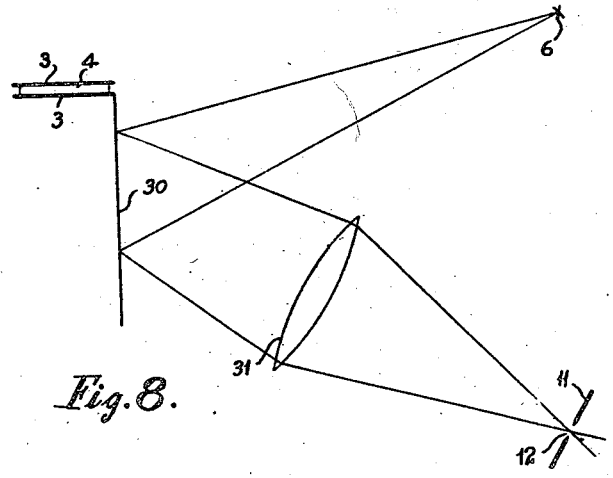

In Fig. 8 is shown yet another method whereby modulation of a beam may be brought about by the formation of waves in its path. A thin silvered mica plate 30 has fixed to it at one edge a piezo-electric crystal 4, covered by metal plates or layers of gilding 3, these layers lying perpendicular to the electric axis of the crystal. Modulated high frequency potentials applied to the plates 3 produce in the crystal 4 vibrations which set up flexural waves in the plate 30. Light from a source 6 reflected from the plate 30 is collected by the lens 31 and focused on to the aperture 12 of the diaphragm 11. The flexural waves in the plate 30 cause diffraction effects in the beam of light from the source 6 in a manner similar to that of the preceding examples.

The waves may of course be produced otherwise than by means of the piezo-electric or electrostatic means so far described. For example waves, either flexural or compressional, may be produced by mechanical means, e. g. by vibrating tuning fork or similar device, or by electromagnetically operated diaphragm. Waves may also be produced by a metal rod vibrating in sympathy with electromagnetic impulses by virtue of its magnetostrictive properties, or by electrolytic means, for example, by alternate polarisation and depolarisation at an electrode immersed in a conducting solution when high frequency currents flow from it through the solution. It will be understood that the invention is not limited to the specific examples cited above, but that these examples serve to show how mechanical vibrations produced in a body located in an optical system to produce modulation of a light beam according to the modulation of the said waves. The wave-bearing body may if desired, be in the form of a transparent solid or gas.

Any of the forms of modulating device described above may be used in connection with the apparatus of Fig. 4. In the cases illustrated in Figs. 5 to 7 however, the frequencies suitable for producing ripples on the liquid surface are in general lower than those suitable for compressional waves in the liquid. If desired, in such cases, a carrier frequency F may be modulated, not only with the modulation frequencies to be converted into light variations, say M, but also at a lower frequency (say f) appropriate to the generation of ripples on the liquid surface.

In any form of the invention means may be used to prevent or diminish the unwanted effects whereby standing waves might be produced as a result of reflection of the mechanical waves from boundaries of the wave-bearing body. Such means may for example comprise boundaries of the body so shaped that the reflected waves proceed in directions such that their optical effects are negligible with respect to the particular light beams used. Alternatively, means for damping the reflected waves may be provided, such as boundaries or barriers of materials of suitable physical characteristics. For example, in the case of a liquid along which compressional waves are propagated, a cork boundary may be placed in their path at a suitable distance from their source. Alternatively, the length of the wave-bearing body may be such that the natural damping of the waves during their passage along or through it suffices to reduce to negligible amplitude any reflected waves which might otherwise produce undesirable effects.

Figure 9:
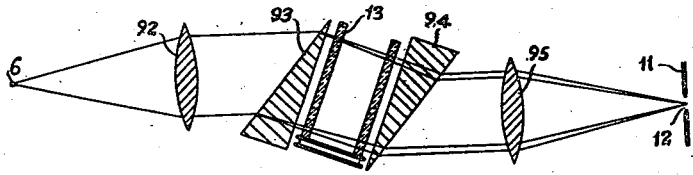
Figs. 9 and 10 show diagrammatically in part sectional side view two forms of optical correcting systems for use with devices according to the present invention.

Since in general the optical effects produced by the mechanical waves in this invention vary with the colour of the light employed, and since in many cases they vary also with the direction of incidence of the light on the wave-bearing body, the optical systems used with this invention in any of its forms may be so arranged that the spectral components of the colours of shorter wavelength (e. g. blue) which are most affected are incident upon the wave-bearing body at a different angle from those components of longer wavelength (e. g. red) which are less affected so that the inherent variation of effect on different colours is neutralised or reduced by variation in their angles of incidence. For example, in the simple case of a liquid or solid wave-bearing body, as described in Fig. 1, the maximum effect is obtained when the light passes through the body in a direction parallel to the mechanical wave front. To secure the compensating effect described, the red components may be made to pass most nearly in this direction, and other spectral components, in order, may be given directions of increasing deviation from it. One optical arrangement to secure this effect is shown in Fig. 9, which shows a pair of similar dispersing prisms of flint glass 93, 94 arranged one on each side of the wave-bearing body 13, so that the prism 93 on the incident side introduces a suitable degree of dispersion in the beam of light before its passage through the wave-bearing body this dispersion being neutralised afterwards by the second prism 94. If desired, the prisms may be in optical contact with the body. With suitable modifications, such a system may be used in conjunction with any of the modulating devices of the present invention.

Figure 10:
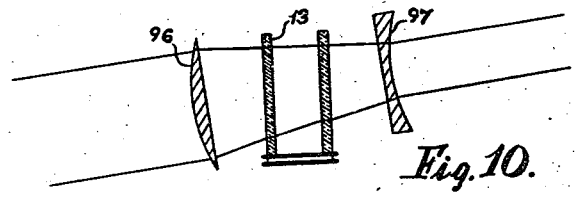

In an analogous way correction may be obtained for the variation in optical effect along the length of the wave-bearing body due to damping of the waves as they proceed along it, or in some cases due to variation in the effective area of the wave front. In the case of damping, the optical effect is inherently greater near the origin of the waves than at a distance from it. The optical arrangement may then be such that at the point of greatest wave amplitude the direction of incidence of the light is inclined to that giving maximum optical effect and that this inclination is progressively reduced for the regions of decreasing amplitude. In the simple cases first described, where the waves are produced in liquid or solid bodies, the direction of maximum effect is usually constant throughout the length of the wave-bearing body. The compensating effect described is then attainable by using a light beam which is slightly divergent or convergent and incident on the wave-bearing body at an angle to the normal so that in the region of maximum wave amplitude the direction of its rays is more inclined to the mechanical wave front than in the region of minimum amplitude. This compensating effect can be brought about simply by focussing and is most conveniently incorporated in the whole associated optical system, by using lenses of appropriate powers. If it is desired, however, to work with parallel beams, it may be attained in the manner shown in Fig. 10 where there is provided on one side of the body 13 a lens 96 of positive power and on the other side a lens of slightly greater negative power, 97, a parallel beam of light being directed upon the combination at a suitable angle. The beam will then be rendered convergent by the lens 96 during its passage through the wave-bearing body, and parallel again afterwards by the lens 97. Clearly by exchanging the positions of the lenses 96 and 97 the beam may be made divergent within the body 13.

The above described correction for damping effects and that previously described for making the system acromatic, may be applied together in the device if desired, either in the forms described or in any other suitable way, according to conditions.

Clearly in all cases described above instead of selecting the central part of the beam by an apertured diaphragm 11, the outer part of the beam may be used if desired. For this purpose the diaphragm is arranged to stop off the central part of the beam and allow the outer part to pass on to the utilisation point. Both the central and the outer portions can be used separately, if desired, since both are modulated. Since the modulation is in opposition the two portions cannot be used together.

I claim:

1. Apparatus for producing a record of variations upon a moving light sensitive surface, said apparatus comprising a body capable of transmitting mechanical waves to produce diffraction grating effects and to be located in the path of a light beam, means for applying a mechanical carrier oscillation modulated with said variations to said body to cause mechanical waves to traverse said body transversely of said light path, thereby diffracting a part of the light beam when passing said body while another part thereof is substantially undiffracted, means for focusing the light in one of said parts emergent from said body to form an image of said waves upon said light sensitive surface, means for screening said light-sensitive surface against non-focused light of said other part arranged between at least part of said focusing means and the light-sensitive surface, and means for moving said light sensitive surface in a direction and at a speed substantially the same as those of said images, in order to immobilise said images relatively to said light sensitive surface.

2. Apparatus for producing a record of mechanical variations upon a moving light sensitive surface, said apparatus comprising a light source, a body capable of transmitting mechanical waves to produce diffraction grating effects and to be located in a path of light from said source, means for applying mechanical variations to said body to cause mechanical waves to traverse said body transversely of said light path, thereby diffracting a part of the light when passing said body while another part thereof is substantially undiffracted, means for focusing the light in one of said parts to form an image of said waves in said body upon said light sensitive surface, means for screening said light-sensitive surface against non-focused light of said other part arranged between at least part of said focusing means and said light-sensitive surface, means for focusing an image of said light source in the neighborhood of said screening means, and means for immobilising said image of the waves relatively to said light sensitive surface.

3. Apparatus for producing a record of variations upon a moving light sensitive surface, said apparatus comprising a body having a surface capable of transmitting oscillations in the form of ripples, said surface being adapted to be located in the path of light, means for applying a mechanical carrier oscillation modulated with said variations to said body surface to cause mechanical waves to traverse said body surface transversely of said light path in the form of ripples whereby a part of the light emergent from said surface is diffracted and another part thereof is substantially undiffracted, means for separating said parts, means for focusing the light in one of said parts to form an image of said ripples upon said light sensitive surface and means for immobilising said image of said ripples relatively to said light sensitive surface.

4. Apparatus for recording sound upon a light sensitive surface, said apparatus comprising a light source, a body having a light reflecting surface capable of transmitting oscillations in the form of ripples to produce a diffraction grating effect, said surface being arranged in the path of light from said source, means for applying to said body a mechanical carrier oscillation modulated in accordance with said sound to produce in said surface ripples modulated in accordance with said sound, said ripples serving to diffract a part of the light reflected from said surface whilst another part of said reflected light is substantially undiffracted, means for separating one of said parts from the other, means for supporting a light sensitive record carrier, means for utilising the light in one of said parts to form an image of said ripples on said record carrier, and means for moving said record carrier to immobilise said image relatively thereto.

JOHN HENRY JEFFREE.